United States Patent [19]
Beisswenger et al.

[11] Patent Number: 6,070,903
[45] Date of Patent: Jun. 6, 2000

[54] ASSEMBLY OF AN INFLATOR AND A GAS EXIT TUBE FOR A VEHICLE OCCUPANT RESTRAINT SYSTEM

[75] Inventors: Roland Beisswenger, Schwäbisch Gmünd; Franz Öhlert, Aalen-Wasseralfingen, both of Germany

[73] Assignee: TRW Occupant Restraint Systems GmbH, Alfdorf, Germany

[21] Appl. No.: 09/015,451

[22] Filed: Jan. 29, 1998

[30] Foreign Application Priority Data

Feb. 5, 1997 [DE] Germany ............ 297 02 011 U

[51] Int. Cl.⁷ .............. B60R 21/26; B60R 21/28
[52] U.S. Cl. ............ 280/736; 280/740; 280/742
[58] Field of Search ................ 280/736, 737, 280/740, 741, 742, 730.2, 730.1

[56] References Cited

U.S. PATENT DOCUMENTS

| | | | |
|---|---|---|---|
| 3,687,486 | 8/1972 | Matsui et al. | 280/150 |
| 3,711,115 | 1/1973 | Lohr | 280/150 |
| 3,756,621 | 9/1973 | Lewis et al. | 280/150 |
| 3,856,180 | 12/1974 | Merrell | 222/5 |
| 4,114,924 | 9/1978 | Kasagi et al. | 280/740 |
| 4,268,065 | 5/1981 | Granig | 280/737 |
| 4,289,327 | 9/1981 | Okada | 280/737 |
| 4,907,819 | 3/1990 | Cuevas | 280/736 |
| 5,269,561 | 12/1993 | Davis et al. | 280/736 |

*Primary Examiner*—J. J. Swann
*Assistant Examiner*—Christopher Bottorf
*Attorney, Agent, or Firm*—Tarolli, Sundheim, Covell, Tummino & Szabo L.L.P.

[57] ABSTRACT

An assembly for a vehicle occupant restraint system comprises an inflator and a gas exit tube connected in a gas-tight manner thereto. The inflator is provided with a discharge portion for the gas generated by the inflator when required. The discharge portion comprises a circumferential groove having in cross-section a saw tooth profile with a flank perpendicular to a longitudinal axis of the discharge portion. This flank is located on the side of the groove facing the gas exit tube. The gas exit tube comprises a portion which engages the groove in an interfitting manner by means of a plastically deformed portion and secures the gas exit tube axially thereto at the inflator.

11 Claims, 4 Drawing Sheets

ASSEMBLY OF AN INFLATOR AND A GAS EXIT TUBE FOR A VEHICLE OCCUPANT RESTRAINT SYSTEM

The invention relates to an assembly for a vehicle occupant restraint system, comprising an inflator and a gas exit tube connected gas-tight to the latter.

BACKGROUND OF THE INVENTION

A vehicle occupant restraint system comprises usually an inflator, an actuating sensing system for the inflator as well as a gas bag which, when required, is translated by means of the compressed gas generated by the inflator from a folded condition into an unfolded condition in which it is able to provide protection for a vehicle occupant.

Usually, the gas generated by the inflator flows directly into the gas bag or via guide passages in a housing in which the inflator is arranged. However, restraint systems have recently become known in which the inflator needs to be arranged spaced away from the gas bag by a specific amount due to design reasons, this being the reason why the gas generated by the inflator needs to be directed into the gas bag. One example of such a vehicle occupant restraint system reads from the German Utility Model 296 05 896. In this system the inflator is connected by means of a gas exit tube to the gas bag arranged remotely therefrom.

BRIEF DESCRIPTION OF THE INVENTION

The invention provides a connection between the gas exit tube and the inflator, which can be formed in a particularly simple manner. According to the invention, the assembly for a vehicle occupant restraint system comprises an inflator and a gas exit tube connected in a gas-tight manner thereto. The inflator is provided with an discharge portion for the gas generated by the inflator when required. The discharge portion comprises an arresting means which is formed by a circumferential groove having in cross-section a saw tooth profile with a flank perpendicular to a longitudinal axis of the discharge portion. This flank is located on the side of the groove facing the gas exit tube. The gas exit tube comprises an engaging means which engages the arresting means in an interfitting manner by means of a plastically deformed portion and secures the gas exit tube axially thereto at the inflator. By using a groove with a saw tooth profile, a reliable connection between the gas exit tube and the inflator is achieved, this connection being easy to manufacture as well as quickly and automatically to fit. Furthermore, a reliable seal between the inflator and the gas exit tube is assured. As the gas exit tube, a rigid or a flexible exit tube may be selected.

It is preferably provided for that the portion of the gas exit tube engaging the groove is plastically deformed by rolling. Rolling is a working method which can be performed with a minimum of effort. This allows to store and handle the inflator separately from the other components for a considerable portion of the fitting process, this being an advantage with respect to safety. The inflator can, due to the connection formed in a simple manner with the gas exit tube, be fitted in the vehicle at the latest possible time.

Further features of the invention are set forth in the sub-claims.

BRIEF DESCRIPTION OF THE DRAWINGS

The invention will now be described with reference to two embodiments, illustrated in the enclosed drawings, in which.

DETAILED DESCRIPTION OF THE INVENTION

Figure 1:
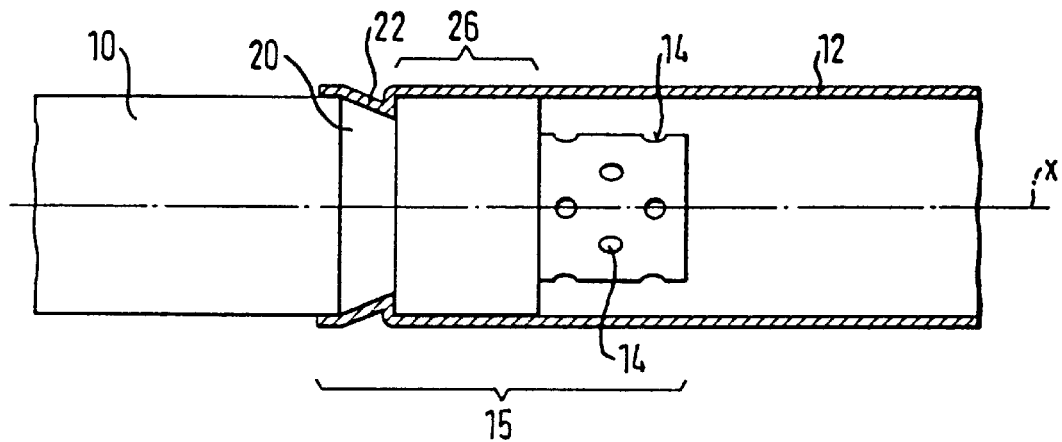
FIG. 1 is a partly sectioned schematic side view of an assembly in accordance with a first embodiment of the invention.
Figure 6:
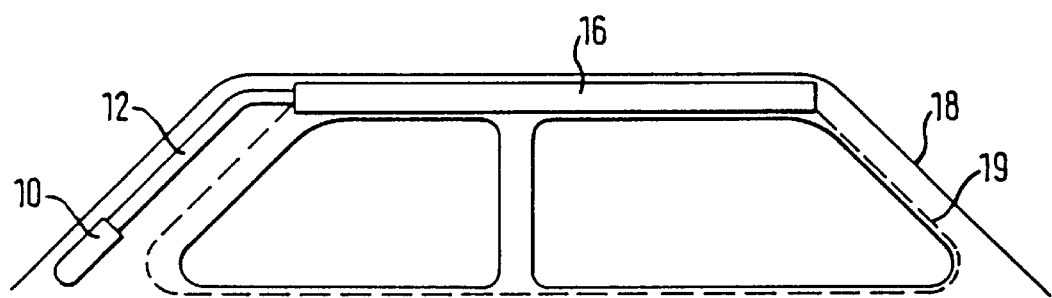
FIG. 6 shows schematically an application for an assembly in accordance with the first embodiment of the invention.

FIG. 1 schematically shows an assembly in accordance with a first embodiment of the invention. This assembly comprises an inflator 10 shown in a scrap view as well as a gas exit tube 12. The inflator 10 is generally tubular and provided at its axial end, depicted on the right in FIG. 1, the so-called discharge portion with orifices. The gas exit tube 12 is provided for connecting the inflator to a gas bag shown schematically in FIG. 6, this gas bag being arranged along a roof strut of a vehicle indicated schematically. When the gas bag 16 is deployed, it covers the side windows of a vehicle so that the vehicle occupants are protected in the case of a side impact. The contour of the deployed gas bag is indicated by the reference numeral 19.

As is further apparent from FIG. 1, the inflator 10 is provided with an arresting means 20 in the region of the discharge portion 15 on its outer circumference. This arresting means 20 is configured as a circumferential groove with a saw tooth profile, the flank of which perpendicular to the longitudinal axis x is arranged on the side of the groove 20 facing the orifices 14.

At its end on the left as shown in FIG. 1, the gas exit tube 12 is provided with an engaging means 22 engaging the groove 20. This engaging means 22 is embodied as a plastically deformed portion of the gas exit tube 12, the profile of which is adapted to the profile of the groove 20. Thereby, the gas exit tube 12 is secured to the inflator 10 by the engaging means 22 of the gas exit tube 12 engaging the groove 20 with an interlocking fit. At the same time the engaging means 22 of the gas exit tube 12 engaging the groove 20 forms a seal so that the inflator 10 is connected gas-tight to the gas exit tube 12. The effect of this seal is supported by a guiding portion 26 in which the gas exit tube 12 closely adjoins the outer circumference of the inflator 10. This guiding portion 26 has additionally the function of stabilising the gas exit tube 12 relative to the inflator 10 so that bending moments acting between the gas exit tube 12 and the inflator 10 are kept away to a major extent from the groove 20 and the engaging means 22 engaging therewith.

Figure 2:
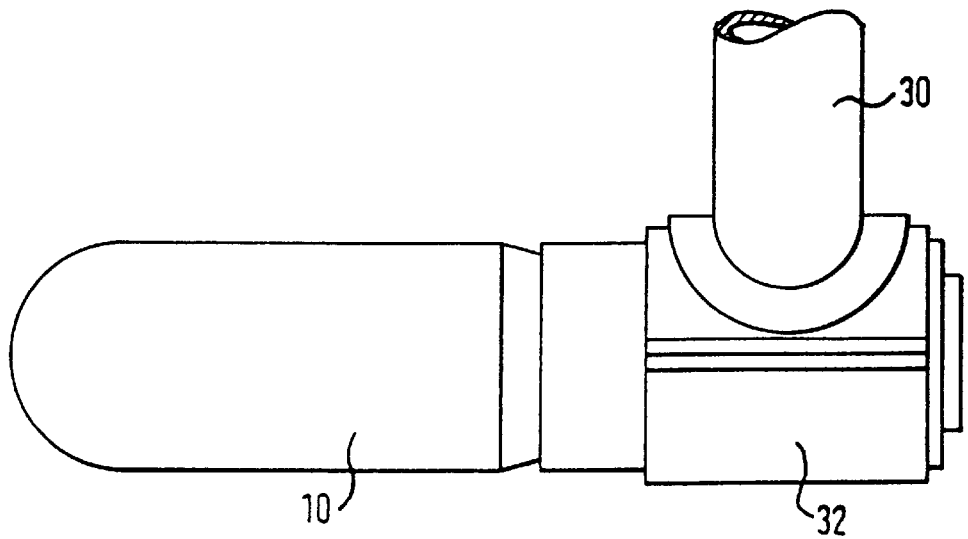
FIG. 2 is a schematic side view of an assembly in accordance with a second embodiment of the invention.
Figure 7:
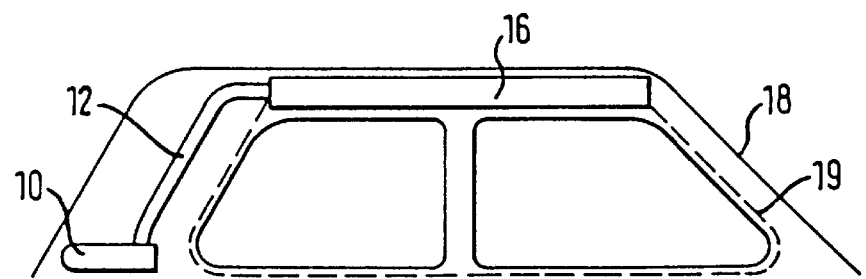
FIG. 7 shows schematically an application for an assembly in accordance with the second embodiment of the invention.

In FIG. 2, a second embodiment of the invention is shown. Unlike the first embodiment in which the gas exit tube 12 extends axially relative to the inflator 10, in this second embodiment the gas exit tube 12 extends radially relative to the inflator 10 (see also FIG. 7).

Figure 3:
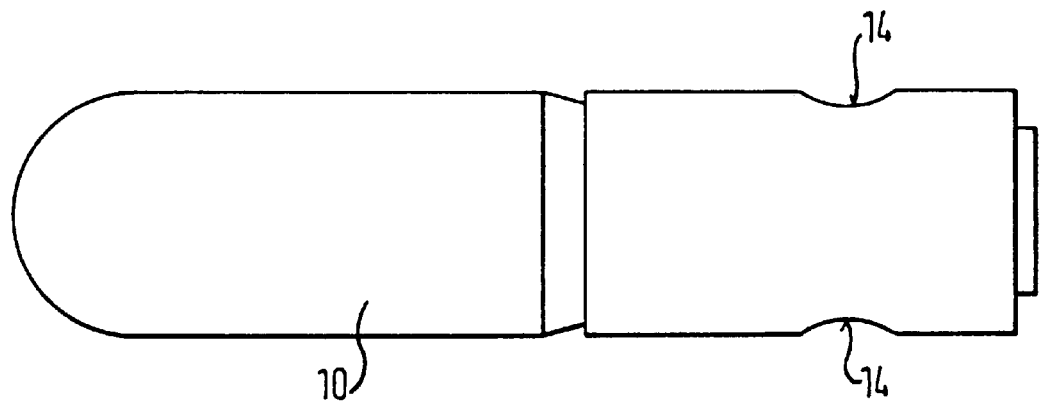
FIG. 3 is a schematic side view of an inflator as used in the assembly shown in FIG. 2.

In FIG. 3, an example of an inflator 10 is illustrated as may be employed in the case of the second embodiment. The difference to the inflator 10 used in the case of the first embodiment is that the orifices 14 are no longer arranged on an appendix of small diameter, but directly on the outer circumference of the inflator. In accordance with a second embodiment it is provided for that in the region of the orifices 14 of the inflator 10 a port 30 is arranged, forming the discharge portion for the gas furnished by the inflator 10. This port is connected to the inflator 10 by means of a clip 32.

Figure 4:
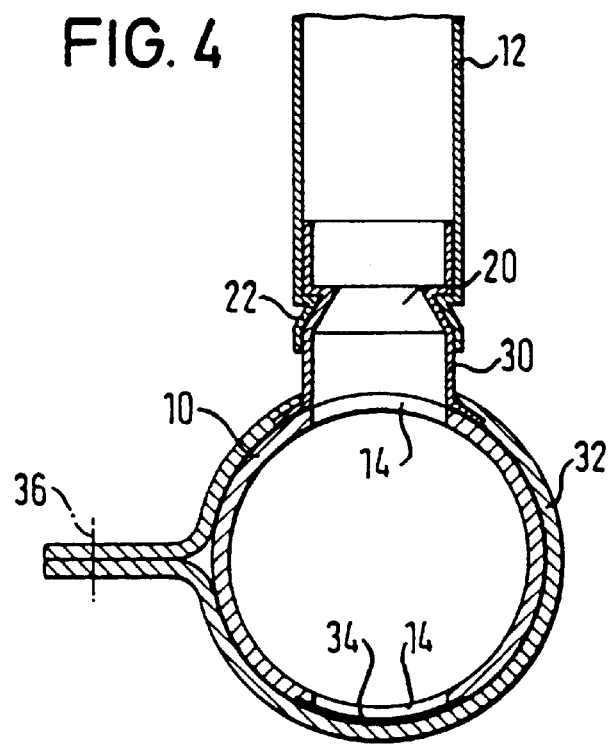
FIG. 4 is a schematic cross-sectional view of a first variant of the assembly shown in FIG. 2.

In FIG. 4, a first variant of the second embodiment of the invention is illustrated. The port 30 is arranged on the upper orifice 14 relative to the view in FIG. 4. Over the lower orifice 14 relative to FIG. 4 a sealing strip 34 is disposed. Both the sealing strip 34 and the port 30 are securely fixed by means of the clip 32 to the outer circumference of the inflator 10. This clip 32 may be tensioned by means of a schematically depicted screw 36 on the outer circumference of the inflator 10, for example.

Tests have indicated that closing off part of the orifices 14 of the inflator 10 has practically no effect on the exit time of the compressed gas generated. The gas exiting through the remaining open orifice 14 flows through the port 30 directly into the gas exit tube 12. In this variant the gas exit tube 12 is secured to the port 30 by means of an arresting means and an engaging means as is known from FIG. 1.

For the port 30 in the variant illustrated in FIG. 4, a relatively soft material may be used which due to the pressure exerted by the clip 32 adapts to the outer circumference of the inflator 10 so that without using an additional seal a gas-tight connection is attained between the port 30 and the inflator 10. In accordance with a variant (not shown) the port 30 may also be coated with a soft material so that it forms a snug gas-tight fit with the inflator 10.

Figure 5:
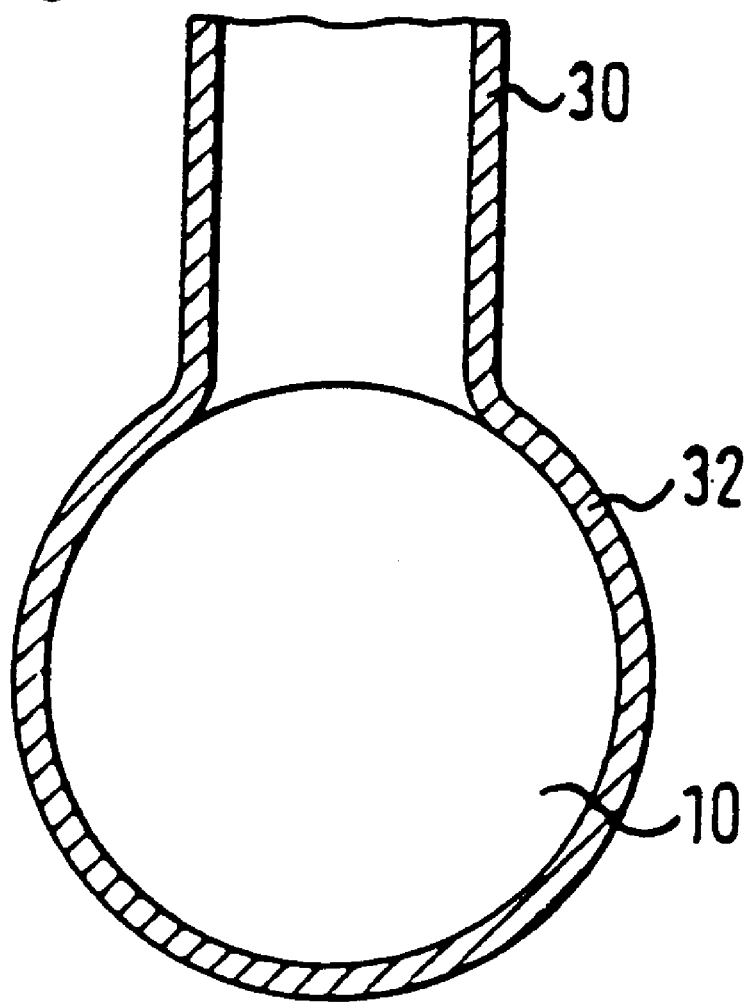
FIG. 5 is a schematic scrap cross-sectional view of a second variant of the assembly shown in FIG. 2.

In FIG. 5, a second variant of the second embodiment of the invention is illustrated. This variant differs from the variants shown in FIG. 4 by the port 30 and the clip 32 being provided integrally with each other. In the variant illustrated the clip 32 is forced on the inflator 10 by pressure.

What is claimed is:

1. An assembly for a vehicle occupant restraint system, comprising an inflator and a gas exit tube connected in a gas-tight manner thereto, said inflator being provided with a discharge portion for the gas generated by said inflator when required, said discharge portion comprising an arresting means, said arresting means being formed by a circumferential groove having in cross-section a saw tooth profile with a flank perpendicular to a longitudinal axis of said discharge portion, said flank being located on the side of said groove facing said gas exit tube, said gas exit tube comprising an engaging means which engages said arresting means in an interfitting manner by means of a plastically deformed portion and secures said gas exit tube axially thereto at said inflator.

2. The assembly of claim 1, wherein said portion of said gas exit tube engaging said groove is plastically deformed by rolling.

3. The assembly of claim 1, wherein said discharge portion is formed by an axial end of said tubular inflator and wherein said arresting means is formed on the outer circumference of said inflator.

4. The assembly of claim 1, wherein said discharge portion is formed by a cylindrical port connected to said tubular inflator and wherein said arresting means is formed on the outer circumference of said port.

5. The assembly of claim 4, wherein said port extends radially relative to the longitudinal axis of said inflator and is secured to said inflator by means of a clip in a region of orifices for the gas generated by said inflator.

6. The assembly of claim 5, wherein said inflator comprises a plurality of said orifices and wherein said clip covers some of said orifices.

7. The assembly of claim 6, wherein a sealing strip is arranged between said clip and said orifices of said inflator covered by said clip.

8. The assembly of claim 5, wherein said port consists of a deformable material so that it forms a snug gas-tight fit with said inflator due to the forces exerted by said clip.

9. The assembly of claim 5, wherein said port is coated with a deformable material so that it forms a snug gas-tight fit with said inflator due to said forces exerted by said clip.

10. The assembly of claim 5, wherein said port and said clip are formed integrally.

11. The assembly of claim 4, wherein said port is provided with a clip-like appendix which is mounted on said inflator.

* * * * *